United States Patent [19]

Washizu et al.

[11] 4,227,108
[45] Oct. 7, 1980

[54] GLASS COMPOUND LAYER FOR MECHANICAL AND THEORMAL PROTECTION OF A LAMINATED IRON CORE ROTARY ELECTROMACHINE

[75] Inventors: Teruo Washizu, Yokohama; Eizo Goto, Chigasaki, both of Japan

[73] Assignee: Tokyo Shibaura Electric Co., Limited, Kawasaki, Japan

[21] Appl. No.: 899,459

[22] Filed: Apr. 24, 1978

[51] Int. Cl.³ .............................................. H02K 3/48
[52] U.S. Cl. .................................... 310/214; 310/45; 310/87; 310/254; 310/58
[58] Field of Search ................... 310/42, 45, 214, 216, 310/217, 52, 59, 64, 65, 87, 88, 254, 258, 259, 261

[56] References Cited

U.S. PATENT DOCUMENTS

| | | | |
|---|---|---|---|
| 2,446,708 | 8/1948 | Levin | 310/214 |
| 3,213,302 | 10/1965 | Barney | 310/45 |
| 3,408,516 | 10/1968 | Kudlacik | 310/214 X |
| 4,103,195 | 7/1978 | Torossian | 310/45 X |

FOREIGN PATENT DOCUMENTS 48-99604 12/1973 Japan .

OTHER PUBLICATIONS

Journal of the Vacuum Society of Japan, vol. 7, No. 12 (1964), pp. 6-10, T. Matsushita (Glass-bonded Myca).
Toshiba Review, vol. 25, No. 11 (1970), pp. 1362-1368, N. Ogino "Solder Glass".
Toshiba Review, vol. 32, No. 7 (1977), pp. 605-606, E. Gotoh "Glass-brazing method".

Primary Examiner—Mark O. Budd
Attorney, Agent, or Firm—Oblon, Fisher, Spivak, McClelland & Maier

[57] ABSTRACT

A laminated iron core for rotary electromachines comprises a plurality of metallic plates laminated on each other, a glass layer disposed between opposed side surfaces of each pair of the contiguous metallic plates to hermetically bond the latter together, and an aggregate-containing glass compound layer disposed on at least a portion of the end faces of the laminar metallic plates which is likely to be subject to a thermal/mechanical impact during use in rotary electro-machines.

5 Claims, 8 Drawing Figures

GLASS COMPOUND LAYER FOR MECHANICAL AND THEORMAL PROTECTION OF A LAMINATED IRON CORE ROTARY ELECTROMACHINE

BACKGROUND OF THE INVENTION

This invention relates to a laminated iron core for rotary electromachines, and particularly to a laminated iron core for rotary electromachines which has improved thermal and mechanical strength.

Laminated iron cores of the class are exposed to substantial vibration and impact in the course of operation of the rotary electromachines and therefore are required to have their laminar metallic plates firmly bonded to each other. Moreover, the laminated iron cores are placed under severe thermal conditions during the operation, and accordingly must have a sufficient thermal resistance as well as mechanical strength. It has been known as advantageous in the light of the thermal resistance to bond laminar metallic plates with glass material, because the bonding glass material may resist against deterioration or fluidization under heat generated by the operating electromachines. Glass material has the disadvantage that it inherently is not sufficiently strong or tough against mechanical and thermal impact.

In stator iron cores of rotary electromachines where a coolant fluid is introduced in the stator devices for cooling the latter, the laminar metallic plates may be bonded with and the stator devices may be hermetically sealed with glass material so as to provide to the passageways of coolant fluid a seal which is not subject to deterioration or fluidization under heat, unlike a synthetic resin sealant applied for that purpose. Such a synthetic resin sealant is likely to be fluidized under heat, resulting in loss of hermetic seal of the laminated iron core stator devices. Glass material can be applied to the stator iron cores of such stator-cooled rotary electromachines for their hermetic bonding, avoiding the problem encountered by application of the synthetic resin sealant. But the other problem which is ascribed to an insufficient thermal and mechanical impact strength inherently of glass material, remains unsolved, the problem that hermetic seal of glass material may be broken by thermal and mechanical impact during operation of rotary electromachines, leading to the fatal hindrance of the electromachines that the coolant fluid is leaked from the stator devices to the rotor side.

A further problem has been likely to be encountered in manufacture of laminated stator iron cores sealed with a glass material layer when a glass material is applied onto and fused by heat for the purpose on that end face portion of the laminar metallic plates of the semi-finished stator iron cores which defines an air gap relative to the opposed periphery of the rotor as assembled with the finished core subsequently in manufacture of rotary electromachines (hereinafter called "air-gap surface" for brevity). The fused material is likely to flow into or penetrate capillary spaces between the laminar metallic plates so as to be left on the air-gap surface in an insufficient amount which cannot form a durable sealant glass layer of continuity or thickness to the purpose.

SUMMARY OF THE INVENTION

One object of the invention is to provide a laminated iron core for rotary electromachines having a good thermal and mechanical strength.

Another object of the invention is to provide a laminated iron core for rotary electromachines which has a hermetical bonding glass material of a good thermal and mechanical impact strength.

Still another object thereof is to provide a laminated stator iron core for rotary electromachines which has a good durability, good thermal/mechanical impact strength glass-material seal formed on the air-gap surface.

A laminated iron core for rotary electromachines is provided according to the invention which comprises a plurality of laminar metallic plates laid on each other, a glass layer disposed between each pair of the contiguous metallic plates to bond one to another, and a glass-compound layer formed on end faces of the laminar metallic plates.

DETAILED DESCRIPTION OF PREFERRED EMBODIMENTS

Figure 1:
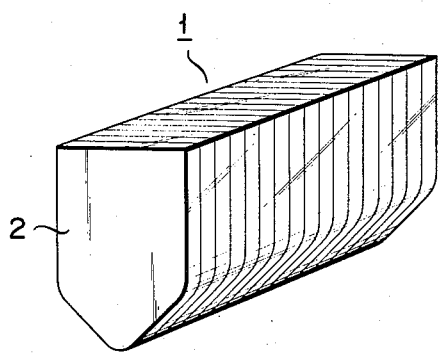
FIG. 1 shows a perspective view of a laminated stator iron core according to one embodiment of the invention.
Figure 2:
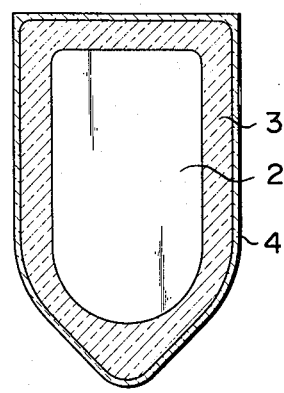
FIG. 2 shows, sectionally in part, a side surface of one of the laminar metallic plates forming the stator iron core of FIG. 1.

Reference is made to FIGS. 1 and 2 showing one segment of a split core for a dynamo stator which is formed by a plurality of laminar plates 2 of metallic material, such as iron. A layer 3 of a low-fusing point glass, such as of $PbO—B_2O_3—Zn$ system, is formed between the opposed side surfaces of each pair of the contiguous plates 2 thereby to air-tightly bond the latter to each other. The glass layer 3, as shown in FIG. 2, extends on the side surfaces of the laminar plates inwardly at a suitable distance, for instance, 20 to 30 mm from the circumferential margin, and entirely surrounds the side surfaces of plates. A glass-compound layer 4 is disposed on the most outer circumferential area on the side surfaces of plates to surround the glass layer 3. The glass compound which forms the layer 4 consists of a similar low-fusing point glass to the layer 3 and an aggregate bonded together with the former. The aggregate may be, 100 to 200 mesh powder of, for instance, magnesia, alumina, ceramic or copper or like kind of metal.

In use with a dynamo of the split core formed by a plurality of the above-described segments 1, each core segment is arranged adjacent the rotor of the dynamo, with the end faces of the laminar metallic plates 2 placed in contact with a coolant fluid. The glass-compound layer formed to overall coat the end faces of plates for protection thereof has a raised degree of strength against thermal and mechanical impact, in addition to its inherent good resistance to heat deterioration or fluidization, thus permitting a good fluid-tight seal to be maintained in the split stator core. Even if the glass-compound layer 4 is cracked in a region adjacent to the outer surface, which may be likely occassioned by alien objects of a somewhat great mass flying from the rotating rotor and impinging upon the stator, the aggregate particles contained in the layer 4 may well prevent such cracks to advance further into the fragile glass layer 3.

In manufacture, granules or particles of glass of the above-mentioned kind are applied and fused under heat on the outer end faces of laminar metallic plates. The combination of glass and glass-compound layers above-stated may be advantageously formed by applying or spraying particles of the aggregate on the fused glass layer while the latter so remains. The aggregate particles applied on the outer end faces of laminar metallic plates are wetted by fused material of the glass layer adjacent to the outer surface thereof and serve to form a low-fluidity skin of the fused glass layer so as to prevent the latter from flowing off from the end faces of laminar metallic plates. This ensures efficiency of the operation. The high-fluidity material under the aggregate skin is allowed to penetrate uniformly spaces between the opposed side surfaces of each pair of the contiguous metallic plates to form a glass layer extending in a substantially even depth from the circumferential margin of the plates, while the aggregate skin material is retained on the end faces of the laminar metallic plates to form a glass-compound layer. A distance or depth in which the glass layer is to extend inwardly on the side surfaces of the laminar plates can be adjusted by controlling a duration of time of heat application and/or penetration of glass material. An intended tough hermetic seal to the laminar metallic plates does not require the glass layer to extend over all the area of the opposed side surfaces of the laminar metallic plates, because of the aggregate-containing glass-compound layer formed on the outer surface of the laminar metallic plates.

Another embodiment will be described with reference to FIGS. 3 to 6.

Figure 3:
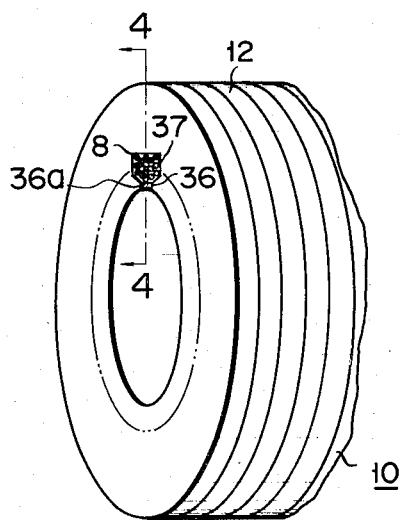
FIG. 3 shows a perspective view, sectional and broken away in part, of a laminated stator iron core according to another embodiment of the invention.
Figure 4:
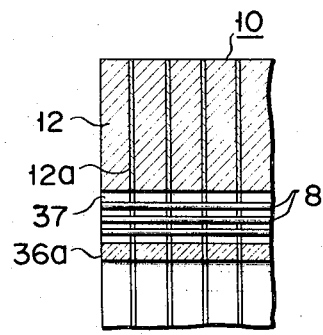
FIG. 4 shows a cross-sectional, enlarged view, broken away in part, taken along line 4—4 of FIG. 3.

FIGS. 3 and 4 show a stator iron core 10 formed by a lamiated plurality of annular silicone-steel plates 12. Each of the annular steel plates has a plurality of cut-outs formed radially around the inner bore whereby a plurality of slots 37 are defined to extend axially of the laminated stator core 10 and open at 36 in the inner bore of the latter. Through each of the slots 37 extending are a plurality of coil conductors 8 which are insulated with Teflon, silicone, etc. The conductors 8 are spaced from each other in the slots 37 to leave therebetween spaces or passageways 24 (see FIG. 6) which will be hereinafter explained. The individual steel plates 12 of stator core 10 are provided on the opposed side surfaces with glass layers 12a of the same composition as in the previously described embodiment. Preferably, the glass layers 12a have a thickness of the order of several microns.

The slot openings 36 of the stator core 10 are filled, as shown at 36a in FIGS. 3 and 4, with a glass compound which may comprise a glass matrix of the same composition as 12a and an aggregate, for instance, of 100 to 20 mesh magnesia particles, dispersed in the glass matrix. The glass matrix is not necessarily of the same composition as that of glass forming the layer 12a.

Figure 5:
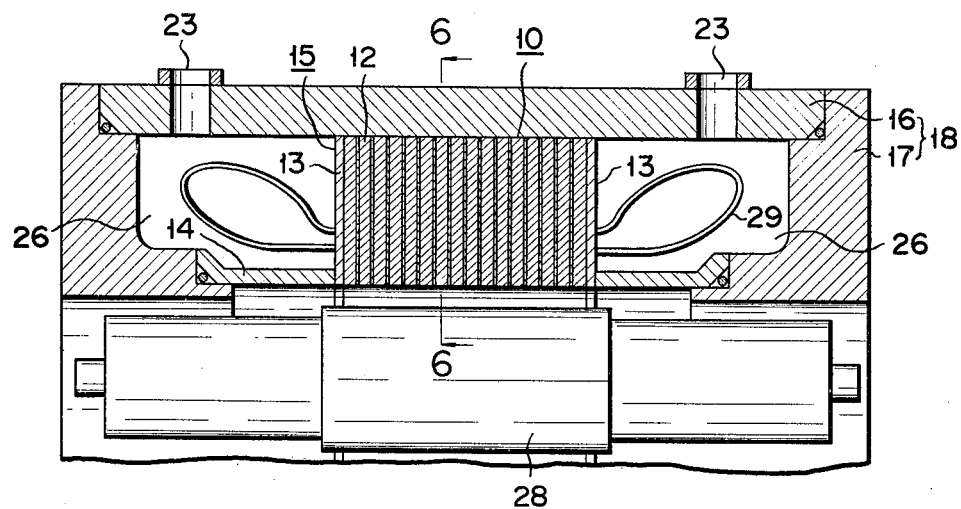
FIG. 5 shows a longitudinally sectional view, with some part broken away, of a stator-cooled rotary electromachine having the laminated stator iron core of FIG. 3 incorporated therein.

For incorporation in a rotary electromachine as shown in FIG. 5 the above laminated stator core 10 is provided with an end plate assembly 15 which comprises a pair of perforate soft-steel end plates 13, 13 disposed on the axially opposed end surfaces of the annular laminated core 10, and a pair of sealing cylindrical members 14, 14 brazed on the outer lateral surfaces of the end plates 13, 13. The insulated coil conductors 8 extending through the core slots 17 are protruding, as shown at 29, from the laterally opposed end plates 13, 13. The stator core 10 thus provided with the end plate assembly 15 and coil conductors 8 is fitted in a stator frame 18 which comprises a cylindrical side plate 16 provided with an inlet and an outlet ports 23, 23 for coolant fluid, and a pair of annular end flange members 17, 17 hermetically secured on the laterally opposed end openings of the cylindrical side plate 16. In the stator frame 18, the outer periphery of the laminar plates 12 of core 10 abuts hermetically against the inner surface of the cylindrical side plate 16 and the cylindrical members 14, 14 hermetically secured on the annular end flange members 17, 17. Thus, a pair of inlet and outlet annular compartments 26, 26 of coolant fluid are defined in the stator frame 18 and separated by the laminated stator core 10. The compartments are communicated through the spaces 24 between coil conductors 8 in slots 37. The cylindrical stator device described coaxially receives a rotor device 28 in its center opening, with an air gap being defined between the periphery of the rotor and the inner wall of the stator.

It can be understood that the above-described stator device of the stator-cooled electromachine can resist to heat deterioration or fluidization because the glass layer formed between the opposed side surfaces of each pair of the contiguous metallic core plates, and further has thermal and mechanical impact strength increased because of the glass compound filler 36a provided to hermetically close the openings of the slots which serve as a passageway for the coolant fluid, thus effectively avoiding the problem of leakage of the coolant fluid from the stator device, which is fatal to the rotary electromachine when occurred at all. The results of tests conducted by the inventors showed that a stator device above-described could resist a heat cycle from 100° to 300° C. and to a pressure of 5 kg/cm².

It can be also understood that since the glass compound is disposed to only fill the openings of the core slots in the air-gap surface of the stator core, the air-gap distance between the stator and the rotor can be minimized advantageously to enhance operation of the electromachine.

In manufacture of the above-described stator device, the glass layers 12a and the glass compound filler 36a located between the side surfaces and in the slot openings of the laminated stator iron core 10, respectively, are fusion-formed simultaneously when the latter is applied with heat and compression pressure in order to be secured in the end plate assembly 15. In this step, the glass compound is substantially prevented by its aggregate content from flowing out through the slots or penetrating spaces between the side surfaces of the laminar core metallic plates, and is thereby retained in the core slot openings in an amount enough to form a good hermetically sealing filler without any depletion of material.

Figure 6:
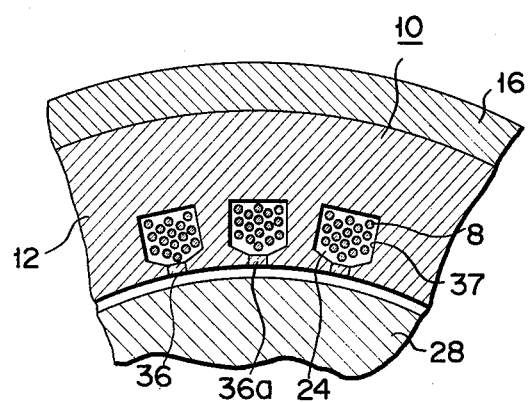
FIG. 6 shows a sectional view taken along line 6—6 of FIG. 5.
Figure 7:
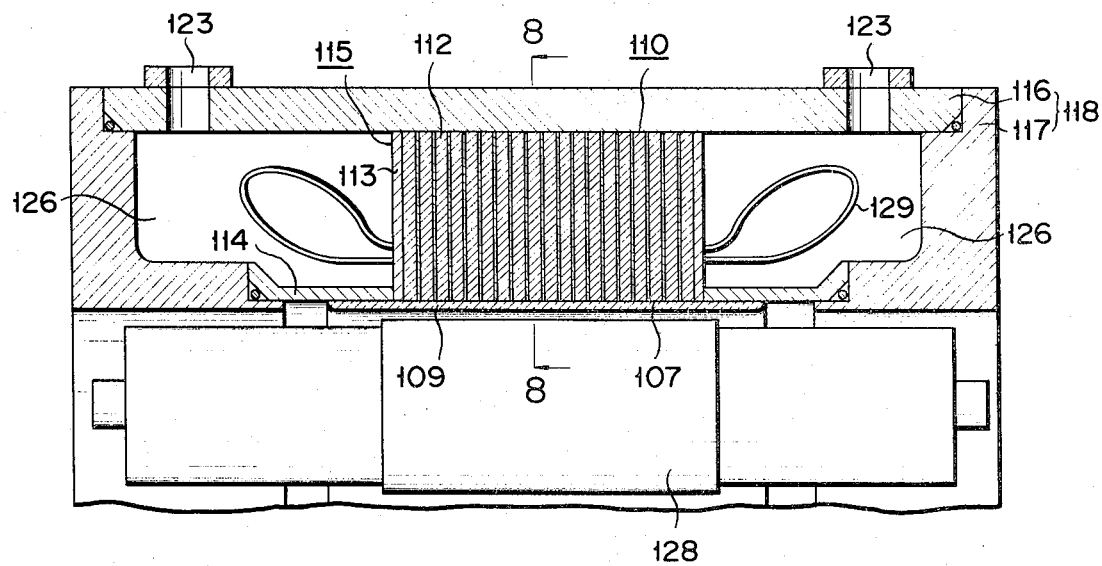
FIG. 7 shows a longitudinally sectional view, with some part broken away, of a stator-cooled rotary electromachine having therein incorporated a laminated stator iron core according to still another embodiment of the invention.
Figure 8:
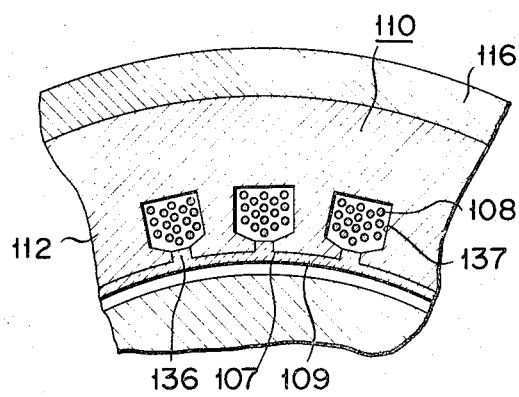
FIG. 8 shows a sectional view taken along line 8—8 of FIG. 7.

Still another embodiment will be described with reference to FIGS. 7 and 8 in which a similar fluid-cooled stator device is shown as that described hereinabove with reference to FIGS. 5 and 6. Corresponding elements in the stator device shown in FIGS. 7 and 8 are allotted similar reference numerals as in FIGS. 5 and 6, so that the description need not be repeated about these elements, but a glass compound is applied to form a shield layer at least over the whole circumference of the air-gap surface or the inner surface of the center bore of the stator core, unlike in the FIGS. 5 and 6 embodiment with a glass compound only filling the slot openings. Specifically, a shield layer 109 is formed by an aggregate-containing glass compound like that of the filler 36a to extend on an inner surface 107 of the center bore of the annular laminated stator core 110 and continuously over the inner surfaces of the sealing cylindrical members 114, 114 of the end plate assembly 115. Material forming the shield layer 109, as shown in FIG. 8, further continuously extends in and hermetically fills the openings at which the slots 137 open to the air-gap relative to the stator 128. Therefore, the shield layer 109 thus extended can hermetically close the slot openings in a more facilitated, effective manner than the glass compound filler disposed to fill exclusively the slot openings. The content of aggregate in the material of the shield layer 109 provides the latter with a strength enough to permit its thickness to be reduced, for instance, to less than 0.4 mm so as to avoid a distance of the air-gap from being undesirably increased by an otherwise thickness of the interposed layer.

As apparent from the foregoing description, the invention provides a laminated iron core for electromachines which is hermetically sealed not only with a good resistance to heat deterioration or fluidization which is ascribed to the inherent property of glass, but with a good thermal and mechanical impact strength which is ascribed to the aggregate contained in glass compound. The provision of glass compound in the laminated stator core in the stator-cooled electromachines is particularly effective in drastically reducing possibility of leakage of coolant fluid.

What is claimed is:

1. A laminated iron core for rotary electromachines comprises a plurality of laminar metallic plates laid on each other, a glass layer disposed between each pair of the contiguous metallic plates to bond one to another, and a glass-compound layer means consisting essentially of glass and aggregates bonded in said glass and formed on end faces of the laminar metallic plates, for providing thermal resistance as well as mechanical impact protection.

2. The laminated iron core for rotary electromachines defined in claim 1 where said glass-compound layer contains aggregates selected from the group consisting of magnesia particles, alumina particles, ceramic particles and copper particles.

3. A laminated stator iron core for rotary electromachines which is hermetically disposed in a stator frame having an interior for flowing a coolant fluid and arranged adjacent a rotor, comprising a plurality of laminar metallic plates, means for bonding said plurality of metallic plates into a laminated assembly in said stator frame, with an air-gap surface formed relative to said rotor, and glass-compound means consisting essentially of glass and aggregates bonded in said glass and disposed at least on said air-gap surface for hermetically sealing said laminated assembly on said air-gap surface from the side of said stator and for providing thermal resistance and mechanical impact protection.

4. A laminated stator iron core for rotary electromachines which is hermetically disposed in a stator frame having an interior for flowing a coolant fluid and arranged adjacent a rotor, comprising a plurality of laminar metallic plates, means for bonding said plurality of metallic plates into a laminated assembly, means for hermetically disposing said laminated assembly in said stator frame, with an air-gap surface formed relative to said rotor, a plurality of slots formed in the laminated assembly each to have an opening, a plurality of coil conductors extending through each of said plurality of slots, with spaces left to define a passageway for said coolant fluid, and glass compound filler means for closing the openings of said slots, said glass compound filler means consisting essentially of glass and aggregates bonded in said glass, for providing thermal resistance as well as mechanical impact protection.

5. The laminated stator iron core defined in claim 4 and further including glass compound means disposed at least on said air-gap surface, said glass compound means consisting essentially of glass and aggregates bonded in said glass.

* * * * *